United States Patent
Rosson

(10) Patent No.: US 9,459,671 B2
(45) Date of Patent: Oct. 4, 2016

(54) SYSTEMS AND METHODS FOR USE IN ADAPTING THE OPERATION OF A GAS TURBINE

(71) Applicant: General Electric Company, Schenectady, NY (US)

(72) Inventor: Randy Scott Rosson, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 378 days.

(21) Appl. No.: 13/776,088

(22) Filed: Feb. 25, 2013

(65) Prior Publication Data

US 2014/0244055 A1  Aug. 28, 2014

(51) Int. Cl.
*G06F 1/26* (2006.01)
*F02C 9/00* (2006.01)

(52) U.S. Cl.
CPC .. *G06F 1/26* (2013.01); *F02C 9/00* (2013.01)

(58) Field of Classification Search
CPC .................................. G06F 1/26; F02C 9/00
USPC ................................................. 700/287–290
See application file for complete search history.

(56) References Cited

U.S. PATENT DOCUMENTS

| | | | |
|---|---|---|---|
| 6,338,009 B1* | 1/2002 | Sato | H02J 3/24 700/286 |
| 2003/0131605 A1 | 7/2003 | Meisner | |
| 2004/0024559 A1 | 2/2004 | Down et al. | |
| 2004/0049480 A1* | 3/2004 | Burrill | G06F 17/30017 |
| 2007/0031238 A1* | 2/2007 | Fujii | F02C 9/20 415/48 |
| 2007/0067114 A1* | 3/2007 | D'Amato | F01D 21/003 702/34 |
| 2007/0271929 A1 | 11/2007 | Berry | |
| 2008/0047275 A1 | 2/2008 | Ziminsky et al. | |
| 2008/0178600 A1 | 7/2008 | Healy et al. | |
| 2010/0138070 A1* | 6/2010 | Beaudoin | F03D 7/0284 700/297 |
| 2010/0199680 A1* | 8/2010 | Nomura | F02C 9/52 60/773 |
| 2011/0018265 A1* | 1/2011 | Hoffmann | F01K 13/02 290/7 |
| 2011/0257801 A1* | 10/2011 | Kumula | F01D 15/10 700/287 |
| 2012/0022712 A1* | 1/2012 | Mosley | H02P 9/04 700/297 |
| 2014/0122011 A1* | 5/2014 | Cao | G05B 23/0221 702/108 |

* cited by examiner

*Primary Examiner* — Kenneth M Lo
*Assistant Examiner* — Alan Chu
(74) *Attorney, Agent, or Firm* — Armstrong Teasdale LLP

(57) ABSTRACT

A control system for use in adapting the operation of a gas turbine is provided. The control system is configured to be coupled to at least one component of the gas turbine. The gas turbine is coupled to a power grid having a standardized frequency. The control system includes a processor and a memory coupled to the processor. The memory includes processor-executable instructions that, when executed by the processor, cause the control system to store a status of the at least one component of the gas turbine and generate and store a first operating setting for the at least one component. The first operating setting corresponds to a first frequency of the power grid that is less than the standardized frequency.

18 Claims, 5 Drawing Sheets

SYSTEMS AND METHODS FOR USE IN ADAPTING THE OPERATION OF A GAS TURBINE

BACKGROUND OF THE INVENTION

The field of the invention relates generally to gas turbines, and more particularly to systems and methods for use in adapting the operation of gas turbines during power grid under-frequency events.

Large increases in electrical power demand placed upon an electrical power distribution grid ("power grid") may reduce the electrical operational frequency of the power grid and may cause an "under-frequency" event. In conventional electrical power generation systems that use one or more heavy-duty industrial gas turbines to supply electrical power to the grid, each turbine supplying power to the grid is synchronized to the electrical frequency of the power grid. As the operational speed of a gas turbine decreases, with other parameters being equal, the power output of the gas turbine generally decreases correspondingly. Consequently, during an under-frequency event, at least one gas turbine coupled to the grid may output a lower power.

Grid code regulations require that power production equipment have the capability to maintain load during under-frequency events. Various regions around the world have different requirements that must be satisfied before power equipment to be coupled to the grid is considered compliant. Typically, gas turbine generators satisfy the code requirements by increasing firing temperature, such that power output is increased. Increases in firing temperature increase power output at a given pressure ratio, which works when the gas turbine does not approach any operating limits, such as a pressure ratio limit or an inlet guide vane ("IGV") position limit. A firing temperature increase is typically achieved by increasing the fuel flow supplied to a combustor in the gas turbine. The increased fuel flow creates a higher pressure at a turbine inlet, which in turn induces a higher back pressure on a compressor upstream from the turbine. Eventually, increasing the fuel flow results in reaching an operating limit of the compressor, such as the compressor pressure ratio limit, beyond which the compressor experiences a surge.

Generally, because under-frequency events are typically abnormal, rare, and time-limited, gas turbine control limits ("schedules") that represent operational boundaries of the gas turbine, are relaxed to enable regulation-imposed power outputs during under-frequency events to be achieved. Often, the schedules are prepared in view of the capabilities of a gas turbine when it is initially manufactured, and typically do not take into account unit specific hardware variation and/or degradation of gas turbine components over time. Causing a gas turbine to operate in excess of the boundaries may cause increased degradation, may raise the risk of undesired gas turbine events, and may shorten the useful life of the turbine assembly.

BRIEF DESCRIPTION OF THE INVENTION

In one aspect, a control system for use in adapting the operation of a gas turbine is provided. The control system is configured to be coupled to at least one component of the gas turbine. The gas turbine is coupled to a power grid having a standardized frequency. The control system includes a processor and a memory coupled to the processor. The memory includes processor-executable instructions that, when executed by the processor, cause the control system to store a status of the at least one component of the gas turbine and generate and store a first operating setting for the at least one component. The first operating setting corresponds to a first frequency of the power grid that is less than the standardized frequency.

In another aspect, a method for adapting the operation of a gas turbine is provided. The method is performed by a control system including a processor and a memory coupled to the processor. The control system is coupled to at least one component of a gas turbine. The gas turbine is coupled to a power grid having a standardized frequency. The method includes the steps of storing a status of the at least one component of the gas turbine and generating and storing a first operating setting for the at least one component. The first operating setting corresponds to a first frequency of the power grid that is less than the standardized frequency.

DETAILED DESCRIPTION OF THE INVENTION

Figure 1:
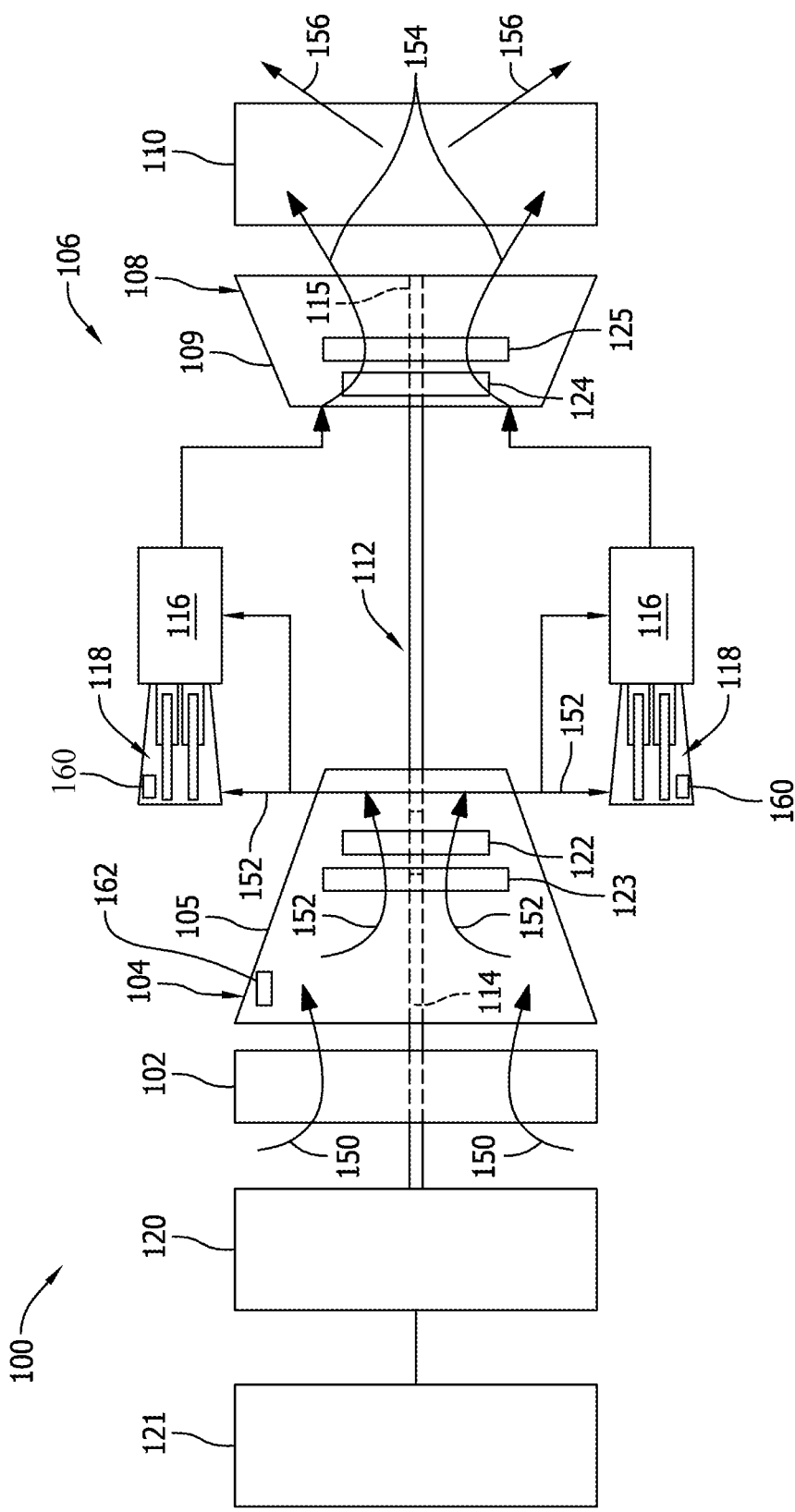
FIG. 1 is a schematic diagram of an exemplary gas turbine coupled to an electrical generator and to a power grid.

FIG. 1 is a schematic view of an exemplary gas turbine 100 coupled to an electrical generator 120 and to a power grid 121. In the exemplary embodiment, gas turbine 100 includes an air intake section 102, and a compressor section 104 that is downstream from, and in flow communication with, intake section 102. Compressor section 104 is enclosed within a compressor casing 105. A combustor section 106 is downstream from, and in flow communication with, compressor section 104, and a turbine section 108 is downstream from, and in flow communication with, combustor section 106. Gas turbine 100 is enclosed within a turbine casing 109 and includes an exhaust section 110 that is downstream from turbine section 108. Moreover, in the exemplary embodiment, turbine section 108 is coupled to compressor section 104 via a rotor assembly 112 that includes, without limitation, a compressor rotor, or drive shaft 114 and a turbine rotor, or drive shaft 115.

In the exemplary embodiment, combustor section 106 includes a plurality of combustor assemblies (i.e., combustors 116) that are each coupled in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to electrical generator 120 via drive shaft 114. Electrical generator 120 is coupled to power grid 121. In the exemplary embodiment, compressor section 104 includes at least one compressor blade assembly 122, (i.e., blade 122) and at least one circumferentially-adjacent inlet guide vane assembly 123.

Also, in the exemplary embodiment, turbine section 108 includes at least one turbine blade assembly, (i.e., bucket 125) and at least one circumferentially-adjacent stationary nozzle assembly 124. Each compressor blade assembly 122 and each turbine bucket 125 is coupled to rotor assembly 112, or more specifically, to compressor drive shaft 114 and turbine drive shaft 115.

In operation, air intake section 102 channels air 150 towards compressor section 104. Compressor section 104 compresses inlet air 150 to higher pressures and temperatures prior to discharging compressed air 152 towards combustor section 106. Compressed air 152 is channeled towards fuel nozzle assembly 118, mixed with fuel (not shown), and burned within each combustor 116 to generate combustion gases 154 that are channeled downstream towards turbine section 108. Combustion gases 154 generated within combustors 116 are channeled downstream towards turbine section 108. After impinging turbine buckets 125, thermal energy is converted to mechanical rotational energy that is used to drive rotor assembly 112. Turbine section 108 drives compressor section 104 and/or electrical generator 120 via drive shafts 114 and 115, and exhaust gases 156 are discharged through exhaust section 110 to ambient atmosphere.

Figure 2:
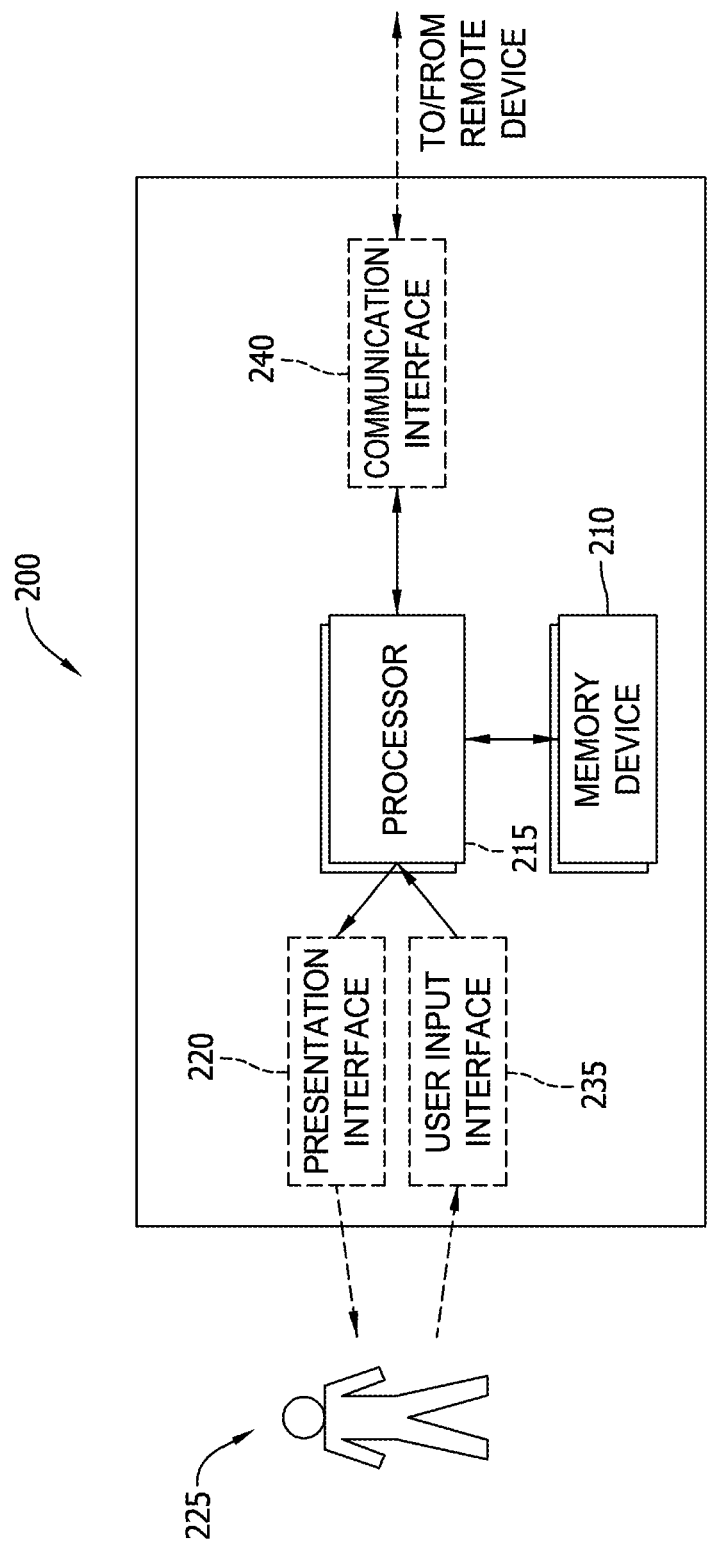
FIG. 2 is a block diagram of an exemplary control system that may be used in operation of the gas turbine shown in FIG. 1.

FIG. 2 is a block diagram of an exemplary control system 200 that may be used in the operation of gas turbine 100. As described in detail below, control system 200 receives, as inputs, information from fuel nozzle assembly sensors 160 and compressor sensor 162, relating to operation of one or more components, for example fuel nozzle assemblies 118 and compressor section 104, of gas turbine 100. More specifically, control system 200 receives information from one or more sensors pertaining to, for example, pressure ratios (e.g., pressure from compressor section 104 versus back pressure induced in combustor section 106) and/or fuel flow data through fuel nozzle assemblies 118 into combustor section 106. Further, control system 200 determines or estimates additional data based on information provided from sensors, for example sensors 160 and 162. For example, rather than measuring the firing temperature directly, control system 200 may determine a firing temperature within combustor section 106 based on fuel flow through fuel nozzle assemblies 118. Additionally, control system 200 receives, as input, load requirements and information about the frequency of power grid 121. Control system 200 may also receive instructions or other inputs from an operator or manager ("user"), through a user input interface 235, as is described in more detail below. Using inputs such as those described above, control system 200 controls the operation of gas turbine 100 to generate a power output that matches the load requirements of power grid 121.

In the example embodiment, control system 200 includes at least one memory device 210 and a processor 215 that is coupled to memory device 210 for executing instructions. In some implementations, executable instructions are stored in memory device 210. In the exemplary implementation, control system 200 performs one or more operations by executing the executable instructions with processor 215. For example, processor 215 may execute instructions that determine a firing temperature in combustor section 106, detect that power grid 121 has a frequency that is less than the standardized frequency (e.g., 60 Hertz in the United States), and/or that cause one or more fuel nozzles 118 to increase an amount of fuel flow into combustor section 106 to facilitate increasing the firing temperature, and thus to generate more power.

Processor 215 may include one or more processing units (e.g., in a multi-core configuration). Further, processor 215 may be implemented using one or more heterogeneous processor systems in which a main processor is present with secondary processors on a single chip. As another illustrative example, processor 215 may be a symmetric multi-processor system containing multiple processors of the same type. Further, processor 215 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. Processor 215 controls the display of the one or more procedures on control system 200, as described in detail herein.

In the exemplary implementation, memory device 210 is one or more devices that enable information such as executable instructions and/or other data to be stored and retrieved. Memory device 210 may include one or more computer readable media, such as, without limitation, dynamic random access memory (DRAM), static random access memory (SRAM), a solid state disk, and/or a hard disk. Memory device 210 may be configured to store, without limitation, source code, object code, configuration data, execution events and/or any other type of data.

In the exemplary implementation, control system 200 includes a presentation interface 220 that is coupled to processor 215. Presentation interface 220 presents information pertaining to the operation of gas turbine 100 to a user 225. Presentation interface 220 may include, for example, a display adapter (not shown) that may be coupled to a display device, such as a cathode ray tube (CRT), a liquid crystal display (LCD), an organic LED (OLED) display, and/or an "electronic ink" display. In some implementations, presentation interface 220 includes one or more display devices.

In the exemplary embodiment, control system 200 includes a user input interface 235 that is coupled to processor 215 to receive input from user 225. User input interface 235 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 220 and user input interface 235.

In the exemplary implementation, control system 200 includes a communication interface 240 coupled to processor 215. Communication interface 240 communicates with one or more devices, for example gas turbine 100, electrical generator 120, and/or power grid 121. To communicate with such devices, communication interface 240 may include, for example, a wired network adapter, a wireless network adapter, and/or a mobile telecommunications adapter. In some embodiments, control system 200 is at least partially incorporated within gas turbine 100, whereas in other embodiments, control system 200 is external or remote to gas turbine 100.

Figure 3:
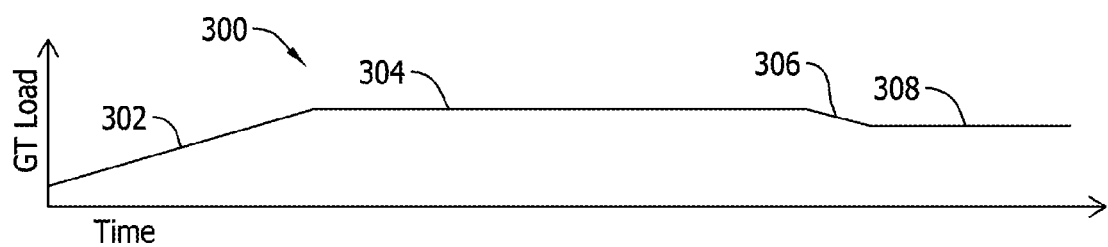
FIG. 3 is an exemplary plot of gas turbine load as a function of time.

FIG. 3 is an exemplary plot 300 of gas turbine load as a function of time. More specifically, FIG. 3 illustrates a percentage of base load as a function of time. As explained above, gas turbine 100 is coupled to electrical generator 120 which is coupled to power grid 121. During time periods 302, 304, 306, and 308, gas turbine 100 (FIG. 1) generates mechanical power that is converted into electrical power by electrical generator 120. In turn, the electrical power is transmitted to power grid 121. Time period 302 pertains to a part load operation of gas turbine 100. During time period 302, gas turbine 100 is synchronized to power grid 121 and is operating normally. Time period 304 pertains to a base load operation of gas turbine 100. Typically, the grid regulations for under-frequency events are specific to base load operation. In the exemplary embodiment, during time period 304, control system 200 adapts the relevant under-frequency control schedules to the current state of gas turbine 100. The frequency of power grid 121 during time period 304 is equal to the standardized frequency for power grid 121 and gas turbine 100 has a "base load". That is, during time period 304, if in the United States, for example, power grid 121 has a frequency of 60 Hertz and power demands from power grid 121 do not exceed an intrinsic limit, based on capabilities of the components of gas turbine 100.

In some embodiments, memory device 210 includes a preprogrammed control limit schedule that is based, for example, on estimated capabilities of components of gas turbine 100 when gas turbine 100 was initially manufactured or installed, or during a scheduled maintenance period. The preprogrammed control limit schedule details operational settings for components of gas turbine 100 that exceed the operational settings used during time period 304. That is, the operational settings of the control limit schedule exceed the intrinsic capabilities of components of gas turbine 100 such that, when temporarily used to control the components, gas turbine 100 generates an increased output power while, in turn, stressing and degrading at least one component more than that component would be stressed or degraded during time period 304. In such embodiments, the control limit schedule is preprogrammed and is not based on current actual capabilities (e.g., age, efficiency, and degradation) of the components of gas turbine 100.

Information about the current capabilities (e.g., age, efficiency, and degradation) of the components of gas turbine 100 is stored in memory device 210 and is constantly updated by control system 200. During time period 304, control system 200 (FIG. 2), which includes a model of the components of gas turbine 100, including their capabilities (e.g., age, efficiency, and degradation), repeatedly generates an adapted control limit schedule for a possible under-frequency event of power grid 121. That is, control system 200 generates offsets or adjustment factors (e.g., multipliers or percentages), and applies such offsets to the preprogrammed control limit schedule to create an adapted control limit schedule. The offsets or adjustment factors are based on received information about the efficiency, age, and degradation of the components of gas turbine 100. For example, control system 200 may generate an offset with a numerical value and subtract it to from a target firing temperature associated with a frequency of power grid 121 in the preprogrammed control limit schedule to arrive at an adapted target firing temperature for the adapted control limit schedule. In other embodiments, other operating settings such as a pressure, a surge limit, an inlet guide vane position, and/or a fuel flow may be calculated for the adapted control limit schedule.

During time period 306, in the exemplary embodiment, the frequency of power grid 121 decreases. In other words, in the exemplary embodiment, time period 306 represents an under-frequency event of power grid 121. During an under-frequency event 306, control system 200 applies the adapted control limit schedule to increase the power output of gas turbine 100. Time period 308 represents an amount of time that elapses after control system 200 applies the adapted control limit schedule. By applying the adapted control limit schedule, the frequency of power grid 121 is prevented from decreasing further.

In some embodiments, no preprogrammed control limit schedule exists in memory 210. In such embodiments, control system 200 generates an adapted control limit schedule not by applying adjustments or offsets to a preprogrammed control limit schedule, but rather by generating an adapted control limit schedule directly from the information about the capabilities of components of gas turbine 100 stored in memory 210 by the model in control system 200.

Figure 4:
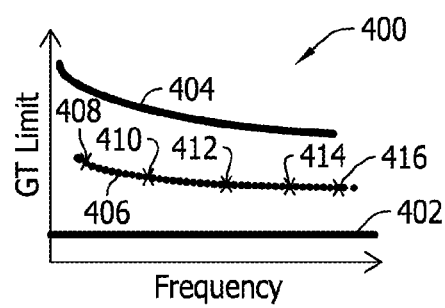
FIG. 4 is an exemplary plot of limits on gas turbine operating settings versus frequency of a power grid.

FIG. 4 is an exemplary plot 400 of limits on gas turbine operating settings versus frequency of power grid 121. In plot 400, frequency of power grid 121 increases to the right. Line 402 represents an intrinsic limit of gas turbine 100. That is, by causing one or more components to operate pursuant to an operating setting exceeding line 402, a risk of increased degradation of components of gas turbine 100 arises. Curve 404 represents settings for operation of gas turbine 100 to compensate for an under-frequency event. For lower frequencies, greater operating settings apply. Settings associated with curve 404 correspond with the preprogrammed control limit schedule discussed with reference to FIG. 3. That is, operating settings associated with curve 404 do not take into account a current status (e.g., including information about current capabilities associated with age, efficiency, and degradation) of components of gas turbine 100 and is akin to the above-described preprogrammed control limit schedule. Curve 406 represents a control limit schedule that takes into account the current capabilities (e.g., age, efficiency, and degradation) of components of gas turbine 100. That is, curve 406 corresponds with the adapted control limit schedule discussed above, with reference to FIG. 3. Curve 406 includes five points, 408, 410, 412, 414, and 416. Each of points 408, 410, 412, 414, and 416 is calculated sequentially by control system 200 as discussed in more detail herein. In some embodiments, control system 200 may perform interpolation or curve-fitting calculations to determine operating settings between any of points 408, 410, 412, 414, 416. Additionally, in some embodiments, control system 200 may calculate settings for more or less than five points along curve 406.

Figure 5:
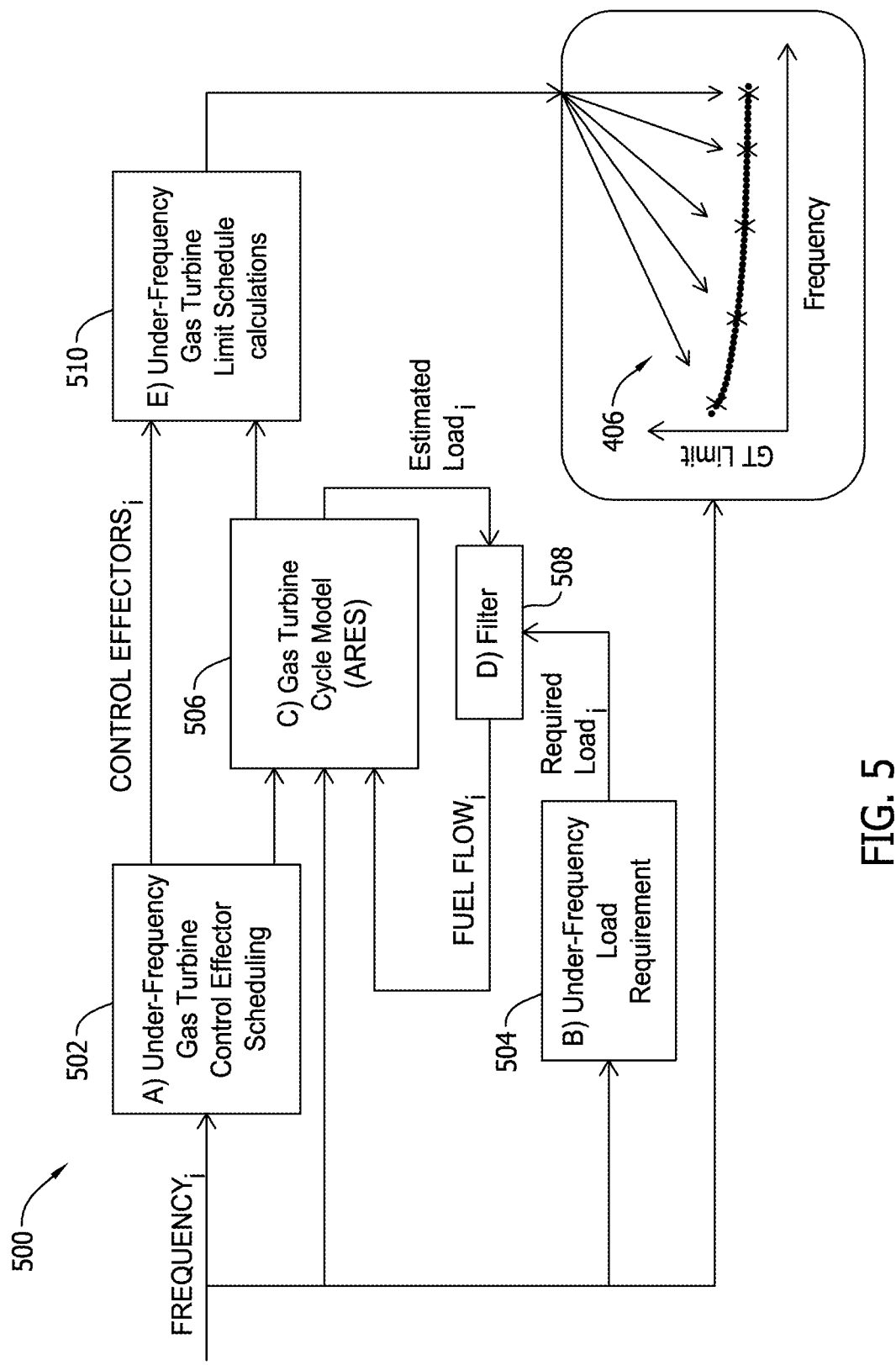
FIG. 5 is a functional block diagram of an exemplary additive feature to the control system shown in FIG. 2 for adapting the operation of the gas turbine shown in FIG. 1.

FIG. 5 is a functional block diagram of an exemplary additive feature to control system 200 for adapting the operation of gas turbine 100. Block 502 represents a control effector scheduling function of control system 200. As discussed above, one or more operating settings for gas turbine 100 is changed by control system 200 to compensate for an under-frequency event in power grid 121. For example, control system 200 may change a position of inlet vane assembly 123 to adjust an amount of power output from gas turbine 100.

Block 504 represents functionality of control system 200 for identifying an under-frequency load requirement. That is, rules for power output of gas turbine 100 for a given under-frequency event are identified by the functionality of block 504. More specifically, a jurisdiction in which gas turbine 100 is located generally has defined a set of rules, specified, for example, in terms of a percentage of nominal output, that gas turbine 100 must generate for a given frequency of power grid 121. Such rules are stored in memory device 210 and accessed by processor 215 to determine a required power output of gas turbine 100. In other instances where the jurisdiction does not have a defined set of rules for power output in under-frequency events, a default set of rules are stored in memory device 210.

Block 506 is a model that generates information about a current state, operation, and capabilities of gas turbine 100, including tracking an age, efficiency, and degradation of components of gas turbine 100. The model may be based on linear and/or nonlinear system identification, neural networks, and/or combinations of the above. The model takes available information, calculates load, and calculates any additional estimated parameters needed for the generation of adapted under-frequency control limit schedules. Block 506 receives information from sensors, for example sensors 160 and 162, control effector settings from block 502, information pertaining to the current frequency of power grid 121, and output from block 508, described below. Based on information input into block 506, block 506 may estimate conditions that might not be measured directly, such as a firing temperature within combustor 116. Likewise, in an exemplary embodiment, block 506 calculates an estimated load of gas turbine 100.

Block 508 represents a filter, for example a proportional-integral ("PI") controller. Other types of filters may be used to provide the functionality described herein. Block 508 receives a load requirement from block 504 and an estimated load of gas turbine 100 from block 506. Block 508 adjusts target operating settings of gas turbine 100 to match the estimated load output from block 506 with the load requirement output from block 504. For example, the model represented by block 506 may include fuel flow information for operation of gas turbine 100 when power grid 121 has a frequency of, for example, 60 Hertz. Based on the aforementioned output of blocks 504 and 506, block 508 determines, for example, what amount of fuel flow is required to meet a load requirement corresponding to a power grid frequency of 58 Hertz. The output of block 508 is directed back into block 506.

Block 510 receives the output of blocks 502 and 506 (i.e., control effector positions and model information, including component age, degradation, and efficiency) and calculates adjustment factors or offsets to be applied to a preprogrammed control limit schedule to generate an adapted control limit schedule, as discussed with reference to FIGS. 3 and 4. In other embodiments, block 510 does not apply adjustments to a preprogrammed control limit schedule but rather generates an adapted control limit schedule directly from the stored information about current capabilities (e.g., age, degradation, and efficiency) of components of gas turbine 100, generated by the model (block 506). The adapted control limit schedule, corresponding to curve 406 and including points 408, 410, 412, 414, and 416 (FIG. 4), is continuously revised or regenerated, such that as conditions within gas turbine 100 change, the adapted control limit schedule changes as well. However, in some embodiments, control system 200 stops regenerating the adapted control limit schedule when an under-frequency event actually occurs, and resumes regeneration of the adapted control limit schedule when the under-frequency event ends. As discussed above, control system 200 applies, to one or more components of gas turbine 100, operating settings generated for the adapted control limit schedule when an under-frequency event occurs.

Figure 6:
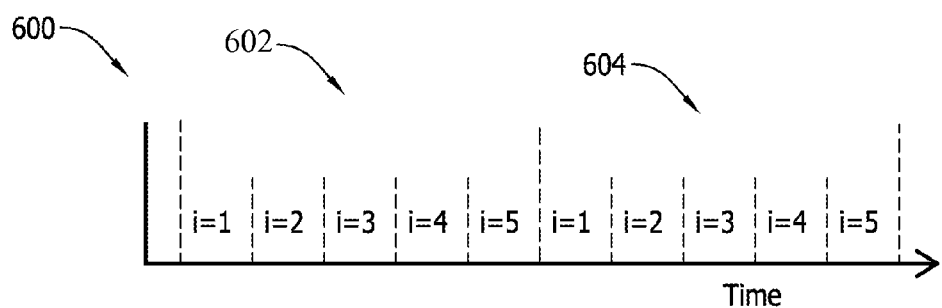
FIG. 6 is a diagram of an exemplary data point sequencing process which may be implemented using the control system shown in FIG. 2.

FIG. 6 is a diagram of an exemplary data point sequencing scheme 600 which may be implemented by control system 200 (FIG. 2). A first time period 602 and a subsequent time period 604 are each divided into five time slots. In each time slot, i, an operating setting corresponding to a point 408, 410, 412, 414, or 416 (FIG. 4) on curve 406 is calculated. That is, in each time slot, i, control system 200 calculates an operating setting corresponding to a given frequency for power grid 121. It should be understood that the frequency corresponding to each point 408, 410, 412, 414, and 416 is not the current frequency of power grid 121, but rather is a potential frequency of power grid 121. Accordingly, control system 200 generates operating settings for a possible future under-frequency event. After generating a fifth operating setting, corresponding to point 416 on curve 406, control system 200 loops back to generating a first operating setting in time period 604. As explained above, curve 406 and points 408, 410, 412, 414, and 416 represent the adapted control limit schedule for gas turbine 100. In other embodiments, rather than calculating five operating settings, control system 200 calculates a different number of operating settings.

Figure 7:
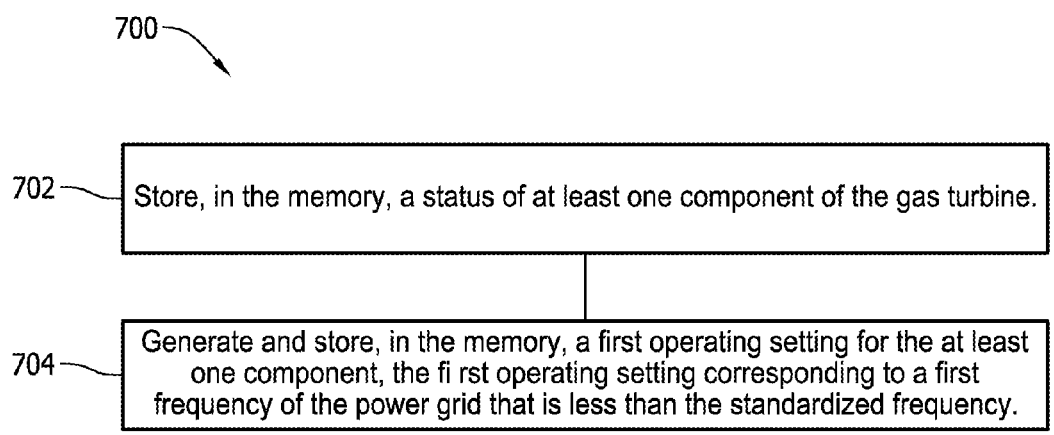
FIG. 7 is a flow chart of an exemplary process for adapting under-frequency control limit schedules which may be implemented using the control system shown in FIG. 2.

FIG. 7 is a flow chart of an exemplary process 700 for adapting under-frequency control limit schedules which may be implemented by control system 200 (FIG. 2). At step 702, control system 200 stores, in memory device 210, a status (e.g., the capabilities) of at least one component of gas turbine 100. At step 704, control system 200 generates, in memory device 210, a first operating setting for the component. The first operating setting corresponds to a first frequency of power grid 121 that is less than the standardized frequency (e.g., 60 Hertz). For example, in generating the adapted control limit schedule discussed above and represented by curve 406, control system 200 may calculate at point 410, corresponding to 58 Hertz, that a firing temperature in combustor 116 must be 100 degrees hotter than the firing temperature when the power grid is operating at 60 Hertz. In other words, the firing temperature must be, for example, 3100 degrees Fahrenheit rather than 3000 degrees Fahrenheit, when power grid 121 is at 58 Hertz. Accordingly, control system 200 generates and stores the corresponding operating setting in memory 210. The operating setting may be, for example, the 3100 degree Fahrenheit temperature, a fuel flow, a pressure, a surge limit, and/or other operating settings that will cause gas turbine 100 to increase the firing temperature to meet the load requirements associated with a 58 Hertz power grid frequency.

A technical effect of systems and methods described herein includes at least one of: (a) storing a status of at least one component of a gas turbine; and (b) generating and storing a first operating setting for the at least one component, the first operating setting corresponding to a first frequency of a power grid that is less than a standardized frequency.

As compared to known systems and methods for adapting the operation of a gas turbine, the systems and methods described herein enable a gas turbine control system to continuously generate operating settings for an under-frequency event, taking into account the current status of one or more components of the gas turbine. Accordingly, gas turbines operated in accordance with the systems and methods described herein may operate with increased reliability during under-frequency events.

Exemplary embodiments of systems and methods for adapting the operation of a gas turbine are described above in detail. The systems and methods described herein are not limited to the specific embodiments described herein, but rather, components of the systems and/or steps of the methods may be utilized independently and separately from other components and/or steps described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A control system configured to be coupled to at least one component of a gas turbine for use in adapting an operation of the gas turbine, the gas turbine is coupled to a power grid having a standardized frequency, said control system comprises a processor and a memory coupled to said processor, said memory includes processor-executable instructions that, when executed by said processor, cause said control system to:
selectively control the at least one component of the gas turbine in response to a sensed frequency of the power grid being one of the standardized frequency and a first frequency;
detect a first status of the at least one component of the gas turbine at a first time, wherein the power grid is operating at the standardized frequency during the first time;
generate and store a first operating setting for the at least one component based on the first status of the at least one component, the first operating setting for use in response to the first frequency of the power grid that occurs at any time between the first time and a second time, wherein the first frequency is less than the standardized frequency;
detect a second status of the at least one component of the gas turbine at the second time that is subsequent to the first time, wherein the power grid is operating at the standardized frequency during the second time, and wherein the second status indicates a reduction in capabilities of the at least one component at the second time relative to at the first time; and
generate and store a second operating setting for the at least one component based on the second status of the at least one component, wherein the second operating setting is for use in response to the first frequency of the power grid that occurs after the second time.

2. The control system of claim 1, wherein said memory further includes processor-executable instructions that, when executed by said processor, cause said control system to generate a third operating setting for the at least one component, wherein the third operating setting is for use in response to a second frequency that is less than the first frequency.

3. The control system of claim 1, wherein said memory further includes processor-executable instructions that, when executed by said processor, cause said control system to iteratively repeat the steps.

4. The control system of claim 1, wherein said memory further includes processor-executable instructions such that detecting the first status of the at least one component includes detecting information pertaining to an age of the at least one component.

5. The control system of claim 1, wherein the first operating setting includes an inlet guide vane position or a firing temperature.

6. The control system of claim 1, wherein the first operating setting includes a surge limit or a pressure.

7. The control system of claim 1, wherein the first operating setting includes a percentage of an operating setting corresponding to the standardized frequency.

8. The control system of claim 1, wherein the first operating setting includes a multiplier of an operating setting corresponding to the standardized frequency.

9. The control system of claim 1, wherein the first operating setting includes an offset to an operating setting corresponding to the standardized frequency.

10. A method for adapting an operation of a gas turbine, said method is performed by a control system including a processor and a memory coupled to the processor, the control system is coupled to at least one component of a gas turbine, the gas turbine is coupled to a power grid having a standardized frequency, said method comprising the steps of:
selectively controlling the at least one component of the gas turbine in response to a sensed frequency of the power grid being one of the standardized frequency and a first frequency;
detecting a first status of the at least one component of the gas turbine at a first time, wherein the power grid is operating at the standardized frequency during the first time;
generating and storing a first operating setting for the at least one component based on the first status of the at least one component, the first operating setting for use in response to the first frequency of the power grid that occurs at any time between the first time and a second time, wherein the first frequency is less than the standardized frequency;
detecting a second status of the at least one component of the gas turbine at the second time that is subsequent to the first time, wherein the power grid is operating at the standardized frequency during the second time, and wherein the second status indicates a reduction in capabilities of the at least one component at the second time relative to at the first time; and
generating and storing a second operating setting for the at least one component based on the second status of the at least one component, wherein the second operating setting is for use in response to the first frequency of the power grid that occurs after the second time.

11. The method of claim 10, further comprising generating a third operating setting for the at least one component, wherein the third operating setting is for use in response to a second frequency that is less than the first frequency.

12. The method of claim 10, further comprising iteratively repeating the steps.

13. The method of claim 10, wherein detecting the first status of the at least one component includes detecting information pertaining to an age of the at least one component.

14. The method of claim 10, wherein generating a first operating setting includes generating a first operating setting pertaining to an inlet guide vane position or a firing temperature.

15. The method of claim 10, wherein generating a first operating setting includes generating a first operating setting pertaining to a surge limit or a pressure.

16. The method of claim 10, wherein generating a first operating setting includes generating a first operating setting including a percentage of an operating setting corresponding to the standardized frequency.

17. The method of claim 10, wherein generating a first operating setting includes generating a first operating setting including a multiplier of an operating setting corresponding to the standardized frequency.

18. The method of claim 10, wherein generating a first operating setting includes generating a first operating setting including an offset to an operating setting corresponding to the standardized frequency.

\* \* \* \* \*